Patented July 9, 1946

2,403,448

UNITED STATES PATENT OFFICE 2,403,448

PHONOGRAPH RECORD COMPOSITIONS

James S. Massarene, Oradell, N. J., assignor to Interchemical Corporation, New York, N. Y., a corporation of Ohio No Drawing. Application August 1, 1942, Serial No. 453,205

2 Claims. (Cl. 260—16)

This invention relates to compositions for use in the preparation of sound reproducing records, and aims to provide compositions for this purpose characterized by unusual clarity of tone over a prolonged period of use of recordings made thereon, combined with low cost, toughness, and marked ease of application to bases. Specifically, this invention contemplates the use of a composition for this purpose consisting of plasticized cellulose aceto-propionate, compounded with a hard glycerol phthalate resin which is modified with benzoic acid so as to be compatible therewith, and a small percentage of a hard high-melting point wax.

Various compositions have been suggested for use in sound reproducing records. The early records were essentially hard wax; the sound tracks in such records had no permanence. Synthetic heat-converting resins of the phenol-aldehyde type were next used; the tonal reproduction obtainable with this type of composition leaves much to be desired. The art has also used thermoplastic compositions, consisting of cellulose derivatives, with or without plasticizer and resin; but all of the compositions have some shortcomings, either in the faithfulness of reproduction, resistance to wear or handling, or ease of application.

I have found that sound records of unusually good properties can be obtained from thermoplastic compositions comprising a plasticized thermoplastic cellulose aceto-propionate and a glycerol phthalate resin modified with from about 25 to 40% of benzoic acid, together with a small percentage of a hard wax. These compositions contain from 25 to 50% of cellulose aceto-propionate,
24.75 to 45% of glycerol phthalate benzoic acid resin,
15 to 30% of plasticizer,
1 to 4% of wax.

The cellulose aceto-propionate is of the conventional thermoplastic type containing from about 14 to 17% acetyl, and 30 to 33% propionyl groups.

The glycerol phthalate benzoic acid resin is made by reacting glycerol and phthalic anhydride and benzoic acid in such proportions that a reasonably neutral resin is obtained, the benzoic acid comprising from about 25% to 40% of the charge. The resultant resins are compatible with the cellulose aceto-propionate in the high amounts used, which are necessary for the desirable properties which the finished composition has.

The plasticizer is used to give the composition the desired flexibility. Any plasticizer which does not discolor or decompose at 400° F., and at the same time is a plasticizer for the aceto-propionate, may be used; for example, dibutyl phthalate. I prefer, however, to use a plasticizer such as tricresyl phosphate, which is practically non-volatile at ordinary temperatures, and which will therefore remain indefinitely in the composition.

The wax is used to improve the fabrication properties of the records made from the composition. Substantially any hard wax, such as carnauba, candelilla, sugar cane wax and the like can all be used.

The composition can be applied to substantially any base, such as, for example, paper stock, which may be either plain or printed with any desired legend. The composition is melted to about 300° F., and is applied to the base uniformly. On cooling, the record is embossed by the conventional pressing method. The resultant records have certain unusual properties. First, they have exceptional tone range. A second advantage of these materials is that they can be rolled into mailing tubes without danger of breaking or deterioration of the reproducing qualities. Another great advantage of the record is given to it by the toughness of the composition; that is, the reproducing needles can be scratched across the sound track without causing breakdown of the side walls. As a result of this phenomenon, the records will stand an extraordinary amount of abuse without destroying their value. As indicated above, the ratios of the ingredients may be varied within relatively narrow limits. A typical specific composition is the following:

| | Pounds |
|---|---|
| Cellulose aceto-propionate (Hercose AP) | 49 |
| Resin (glycerol phthalate modified with 35% benzoic acid) | 25 |
| Tricresyl phosphate | 25 |
| Wax (mixture of carnauba and candelilla) | 2 |

This composition coats very well, on melting to 400° F., on paper or any other base. It can be applied and smoothed in conventional fashion, and will produce unusually good records.

Obviously, the examples can be multiplied indefinitely within the limits above disclosed, without departing from the scope of my invention.

I claim:

1. A sound-record composition for the production of tough, flexible, abuse-resistant grooved sound records, consisting of a mixture of 25-50% of thermoplastic cellulose aceto-propionate containing from about 14% to 17% acetyl and 30% to 33% propionyl groups, 24.75-45% of a resin comprising glycerol phthalate modified with 25-40% of benzoic acid, 15-30% of a plasticizer for the aceto-propionate which does not discolor or decompose at 400° F., and 1-4% of a hard wax.

2. A sound-record composition for the production of tough, flexible, abuse-resistant grooved sound records, consisting of a mixture of 49 parts by weight of thermoplastic cellulose aceto-propionate containing from about 14% to 17% acetyl and 30% to 33% propionyl groups, 25 parts by weight of a resin consisting of an alkyd glycerol phthalate modified with 25-40% of benzoic acid, 25 parts by weight of tricresyl phosphate, and 2 parts by weight of a hard wax.

JAMES S. MASSARENE.